(12) United States Patent
Ohnishi

(10) Patent No.: US 9,318,085 B2
(45) Date of Patent: Apr. 19, 2016

(54) AUTOMATIC PLAYER MUSICAL INSTRUMENT, AUTOMATIC PLAYING SYSTEM INCORPORATED THEREIN AND OVERHEAT PROTECTOR FOR AUTOMATIC PLAYING SYSTEM

(71) Applicant: Yamaha Corporation, Shizuoka-ken (JP)

(72) Inventor: Kenta Ohnishi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 14/457,301

(22) Filed: Aug. 12, 2014

(65) Prior Publication Data

US 2014/0345437 A1 Nov. 27, 2014

Related U.S. Application Data

(62) Division of application No. 12/605,661, filed on Oct. 26, 2009, now abandoned.

(30) Foreign Application Priority Data

Oct. 29, 2008 (JP) ................................ 2008-278263

(51) Int. Cl.
*G10F 1/00* (2006.01)
*G01K 13/00* (2006.01)
*G10F 1/02* (2006.01)

(52) U.S. Cl.
CPC . *G10F 1/02* (2013.01); *G01K 13/00* (2013.01)

(58) Field of Classification Search
CPC .................................. G10F 1/02; G01K 13/00
USPC .............................. 702/132; 84/13, 20; 361/1
See application file for complete search history.

(56) References Cited

U.S. PATENT DOCUMENTS

| 6,380,861 B2* | 4/2002 | Estelle .................... B05C 5/001 340/588 |
| 6,668,781 B1 | 12/2003 | Seils et al. |
| 6,687,636 B2* | 2/2004 | Van Sant ......................... 702/99 |
| 7,746,620 B2* | 6/2010 | Bedingfield .................. 361/140 |
| 2003/0191597 A1 | 10/2003 | Van Sant |
| 2005/0132871 A1* | 6/2005 | Oba et al. ........................ 84/719 |
| 2005/0211049 A1* | 9/2005 | Fujiwara et al. .................. 84/13 |

FOREIGN PATENT DOCUMENTS

| JP | 58-42888 | 9/1981 |
| JP | 5-33504 | 4/1993 |
| JP | 09-261850 | 10/1997 |

OTHER PUBLICATIONS

Office Action in corresponding Japanese application, mailed Nov. 27, 2012, 8 pages.
Office Action in corresponding Japanese application, mailed Jul. 2, 2013, 5 pages.

* cited by examiner

*Primary Examiner* — Alexander Satanovsky
(74) *Attorney, Agent, or Firm* — Harness, Dickey & Pierce, P.L.C.

(57) ABSTRACT

An automatic player piano is equipped with solenoid-operated actuators for moving keys in automatic performance without fingering of a human player, and an overheat protector is provided for the solenoid-operated actuators so as to prevent the solenoid-operated actuators from overheat; the overheat protector includes not only a temperature sensor and a rescuer but also an information processor, and a computer program runs on the information processor so as to realize a temperature rise estimator for estimating a solenoid temperature on the basis of the amount of current flowing through the solenoid and an environmental temperature determined through the temperature sensor estimator and an overheat detector so as to find an overheated solenoid, thereby making the rescuer interrupt the current for preventing the solenoid-operated actuator from the overheat.

2 Claims, 10 Drawing Sheets

| SOLE-NOID | MEAN CURRENT | INCREMENT OF TEMP. | TEMP. RISE |
|---|---|---|---|
| 1 | 0 | 0 | 0 |
| 2 | $a_{21}$ | $b_{21}$ | 0 |
| 3 | 0 | 0 | 0 |
| ... | ... | ... | ... |
| ... | ... | ... | ... |
| 88 | 0 | 0 | 0 |

FIG 5A

| SOLE-NOID | MEAN CURRENT | INCREMENT OF TEMP. | TEMP. RISE |
|---|---|---|---|
| 1 | 0 | 0 | 0 |
| 2 | 0 | 0 | $c_{21}$ |
| 3 | 0 | 0 | 0 |
| ... | ... | ... | ... |
| ... | ... | ... | ... |
| 88 | 0 | 0 | 0 |

FIG 5B

| SOLE-NOID | MEAN CURRENT | INCREMENT OF TEMP. | TEMP. RISE |
|---|---|---|---|
| 1 | 0 | 0 | $c_{13}$ |
| 2 | $a_{23}$ | $b_{23}$ | $c_{23}(c_{24})$ |
| 3 | 0 | 0 | $c_{33}$ |
| ... | ... | ... | ... |
| ... | ... | ... | ... |
| 88 | 0 | 0 | $c_{83}$ |

FIG 5C

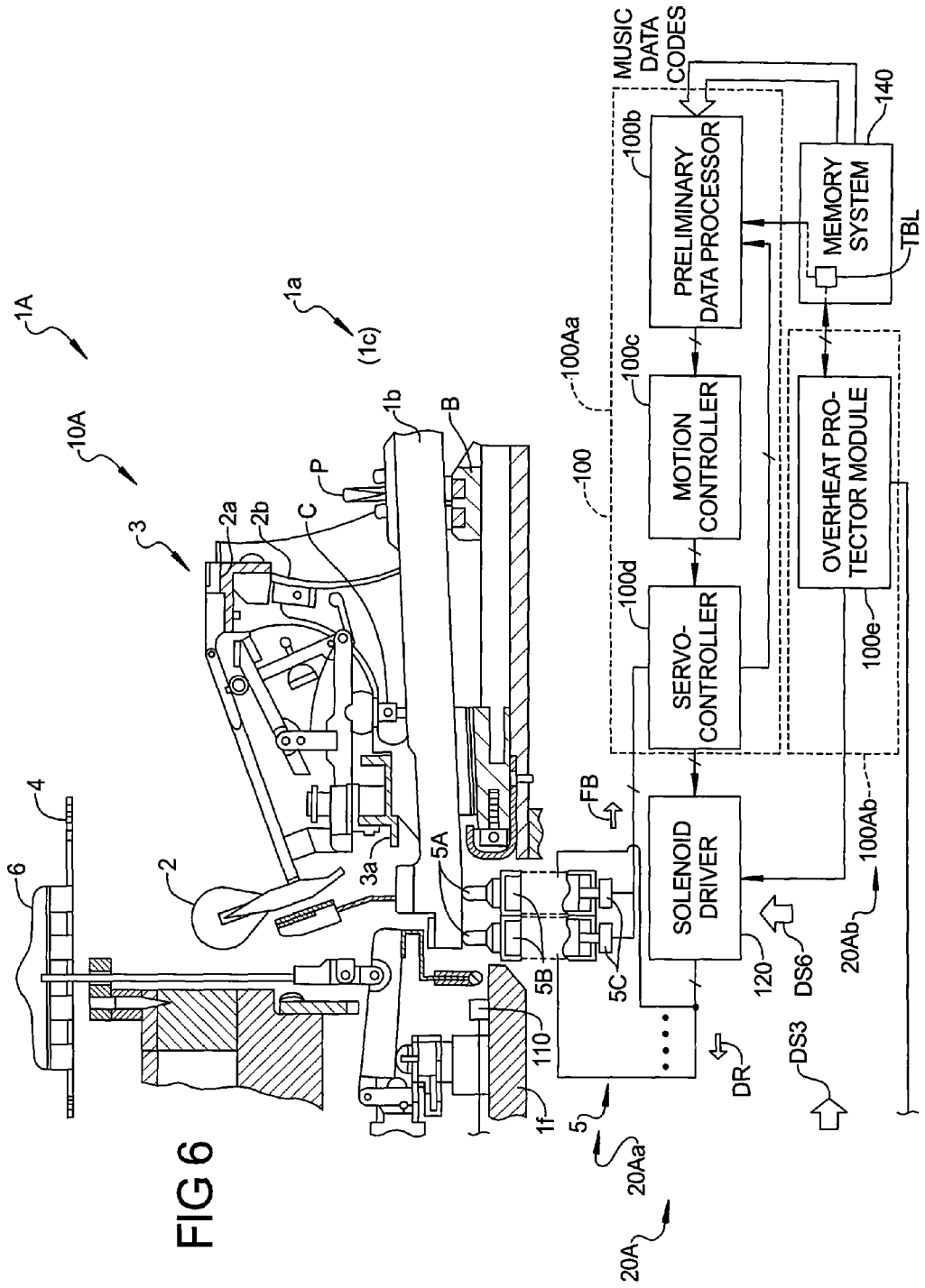

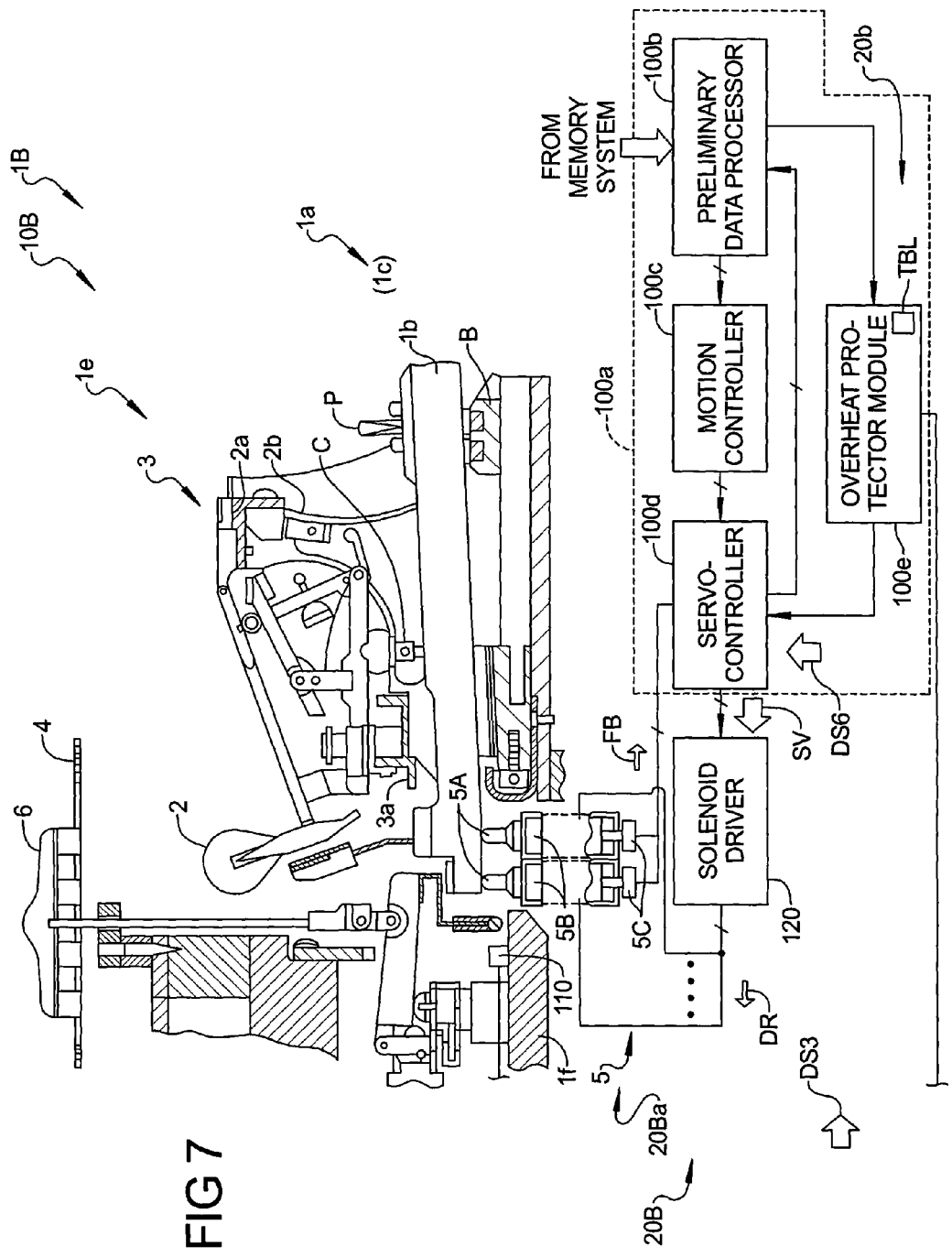

AUTOMATIC PLAYER MUSICAL INSTRUMENT, AUTOMATIC PLAYING SYSTEM INCORPORATED THEREIN AND OVERHEAT PROTECTOR FOR AUTOMATIC PLAYING SYSTEM

CROSS-REFERENCE TO RELATED APPLICATIONS

This application is a divisional of U.S. patent application Ser. No. 12/605,661 filed on Oct. 26, 2009 now abandoned. This application claims the benefit and priority of JP 2008-278263 filed Oct. 29, 2008. The entire disclosures of each of the above applications are incorporated herein by reference.

FIELD OF THE INVENTION

This invention relates to an automatic player musical instrument and, more particularly, to an automatic player musical instrument equipped with solenoid-operated actuators for the automatic playing, the automatic player incorporated in the automatic player musical instrument and an overheat protector for the solenoid-operated actuators of automatic player.

DESCRIPTION OF THE RELATED ART

The automatic player musical instrument is a sort of hybrid musical instrument, and is broken down into a musical instrument such as, for example, an acoustic piano and an automatic player. The musical instrument has a tone generator and manipulators, which are, by way of example, known as keys and pedals, and the manipulators are used in fingering for specifying the pitch of tones. The tone generator is connected to the manipulators, and produces the tones at the specified pitch. A human player selectively depresses and releases the manipulators in his or her performance, and the automatic player also depresses and releases the manipulators in an automatic performance without any fingering of the human player. In the following description, term "standard performance" means the performance carried by the human player, and term "automatic performance" is the performance carried out by the automatic player without any fingering of the human player.

In order to realize the automatic performance, actuators are required for depressing and releasing the manipulators of musical instrument. A typical example of the actuators used in the automatic player musical instrument is a solenoid-operated actuator.

Plural solenoid-operated actuators are provided in association with the manipulators of the musical instrument, and driving current is selectively supplied through a driving circuit to the solenoids in the automatic performance so as to energize the solenoid-operated actuators. The driving current creates electromagnetic fields through the solenoids, and output components of the solenoid-operated actuators convert the electromagnetic force to mechanical force exerted on the manipulators in the electromagnetic fields. As a result, the output components give rise to the movements of the associated manipulators without any fingering of a human player.

While the driving current is following through the solenoids, the solenoids produce not only the electromagnetic fields but also heat. If the amount of heat exceeds a critical value, the solenoid-operated actuators are destroyed. A suitable overheat protector is required for the solenoid-operated actuators for long life-time.

An overheat protector is disclosed in Japan Patent Application laid-open No. Hei 6-289943. The prior art overheat protector comprises a multiplier, a low pass filter, a source of rated value, a comparator and an output data holder such as a flip flop and a switch. These component circuits are connected as follows. The input node of multiplier is connected to a load through which current flows, and the output node of multiplier is connected to the input node of the low pass filter. The output node of low pass filter is connected to one of the input nodes of the comparator, and the source of rated value is connected to the other input node of comparator. The output node of comparator is connected to the input node of the output data holder, and the output node of output holder is connected to the switch. The switch is connected in series to the load so as to prevent the load from overheat.

The multiplier is supplied with a piece of data expressing the amount of current flowing through the load, and raises the amount of current to the nth power. The output signal of multiplier is supplied to the low pass filter, and the low pass filter has predetermined time-to-output characteristics, in which the output of low pass filter reaches the nth power of rated value $Ic^n$ at breaking time Tc.

On the other hand, the source of rated value supplies the nth power of rated value $Ic^n$ to the comparator. While the nth power of amount of current is being less than the nth power of rated value at the breaking time Tc, the comparator supplies the output "TRUE" to the output data holder, and the output data holder keeps the switch turned on. Thus, the switch permits the current to pass through the load. On the other hand, if the nth power of amount of current is equal to or greater than the nth power of rated value at the breaking time Tc, the comparator changes the output from "TRUE" to "FALSE", and the output "FALSE" is supplied to the output data holder. The output data holder changes the switch from on-state to off-state, and the switch prevents the load from overheat.

The prior art overheat protector is available for the solenoid-operated actuators incorporated in the automatic player. However, a problem is encountered in the prior art automatic player in that the prior art automatic player is bulky. In detail, a large number of manipulators are incorporated in the musical instrument, and the solenoid-operated actuator is provided for each of the manipulators. For example, the acoustic piano usually includes eighty-eight keys and three pedals so that the automatic player for the acoustic piano requires ninety-one solenoid-operated actuators for the keys and pedals. As described hereinbefore, the prior art overheat protector is fabricated from various circuits such as the multiplier, low pass filter, source of rated value, comparator, output data holder and switch. The number of those circuits incorporated in the single prior art overheat protector is multiplied by the number of solenoid-operated actuators. As a result, the prior art overheat protectors for the manipulators occupy wide space, and makes the prior art automatic player bulky.

Another problem inherent in the prior art overheat protector is low reliability. The temperature raise is roughly proportional to the difference between the amount of heat generated in the solenoid and the amount of heat radiated from the solenoid, and the amount of heat accumulated in the solenoid-operated actuator until the next actuation and the environmental temperature have influences on the temperature raise. However, only the amount of current flowing through the solenoid is taken into account in the prior art overheat protector. These factors are not taken into the prior art overheat protector. As a result, although the solenoid-operated actuators are operable without any damage, the prior art overheat protector sometimes interrupts the current, and makes the prior art automatic player undesirably malfunction.

SUMMARY OF THE INVENTION

It is therefore an important object of the present invention to provide an automatic player musical instrument, an automatic player of which is prevented from overheat by means of a simple reliable overheat protector.

It is another important object of the present invention to provide the automatic player, which is prevented from overheat by means of a simple reliable overheat protector.

It is also an important object of the present invention to provide the overheat protector, which is reliable and fabricated from component circuits less than the component circuits of the prior art overheat protector.

To accomplish the object, the present invention proposes to estimate a solenoid temperature on the basis of the amount of current passing through solenoids and an environmental temperature.

In accordance with one aspect of the present invention, there is provided an automatic player musical instrument for producing tones without fingering of a human player comprising plural manipulators selectively moved for specifying an attribute of tones, a mechanical tone generator connected to the plural manipulators and producing the tones having the specified attribute, and an automatic playing system including plural solenoid-operated actuators having a critical temperature at which the plural solenoid-operated actuators are damaged, provided in association with the plural manipulators, respectively and selectively energized with a driving signal so as selectively to give rise to the movements of the plural manipulators without the fingering of the human player, an automatic player responsive to pieces of music data expressing a performance so as to produce the driving signal on the basis of the pieces of music data and selectively supplying the driving signal to the plural solenoid-operated actuators and an overheat protector having a temperature sensor provided in the vicinity of the plural solenoid-operated actuators and producing a temperature detecting signal representative of an environmental temperature around the plural solenoid-operated actuators, a rescuer provided for the plural solenoid-operated actuators so as to make the plural solenoid-operated actuators recovered from overheat state and an information processor connected to the temperature sensor and the automatic player, a computer program running on the information processor so as to realize a temperature rise estimator estimating a temperature rise of the plural solenoid-operated actuators on the basis of the amount of current of the driving signal, a solenoid temperature estimator estimating a solenoid temperature of the plural solenoid-operated actuators on the basis of the temperature rise and the environmental temperature and an overheat detector comparing the solenoid temperature with the critical temperature to see whether or not the plural solenoid-operated actuators are in the overheat state for informing the rescuer of the solenoid-operated actuators in the overheat state.

In accordance with another aspect of the present invention, there is provided an automatic playing system for reenacting a performance on a musical instrument having plural manipulators for specifying an attribute of tones comprising plural solenoid-operated actuators having a critical temperature at which the plural solenoid-operated actuators are damaged, provided in association with the plural manipulators, respectively, and selectively energized with a driving signal so as selectively to give rise to the movements of the plural manipulators without a fingering of a human player, an automatic player responsive to pieces of music data expressing the performance so as to produce the driving signal on the basis of the pieces of music data and selectively supplying the driving signal to the plural solenoid-operated actuators, and an overheat protector having a temperature sensor provided in the vicinity of the plural solenoid-operated actuators and producing a temperature detecting signal representative of an environmental temperature around the plural solenoid-operated actuators, a rescuer provided for the plural solenoid-operated actuators so as to make the plural solenoid-operated actuators recovered from overheat state and an information processor connected to the temperature sensor and the automatic player, a computer program running on the information processor so as to realize a temperature rise estimator estimating a temperature rise of the plural solenoid-operated actuators on the basis of the amount of current of the driving signal, a solenoid temperature estimator estimating a solenoid temperature of the plural solenoid-operated actuators on the basis of the temperature rise and the environmental temperature and an overheat detector comparing the solenoid temperature with a critical temperature at which the plural solenoid-operated actuators are damaged to see whether or not the plural solenoid-operated actuators are in overheat state for informing the rescuer of the solenoid-operated actuators in the overheat state.

In accordance with yet another aspect of the present invention, there is provided an overheat protector for preventing plural solenoid-operated actuators from overheat state comprising a temperature sensor provided in the vicinity of the plural solenoid-operated actuators and producing a temperature detecting signal representative of an environmental temperature around the plural solenoid-operated actuators, a rescuer provided for the plural solenoid-operated actuators so as to make the plural solenoid-operated actuators recovered from the overheat state, and an information processor connected to the temperature sensor, a computer program running on the information processor so as to realize a temperature rise estimator estimating a temperature rise of the plural solenoid-operated actuators on the basis of the amount of current flowing through the plural solenoid-operated actuators, a solenoid temperature estimator estimating a solenoid temperature of the plural solenoid-operated actuators on the basis of the temperature rise and the environmental temperature and an overheat detector comparing the solenoid temperature with the critical temperature to see whether or not the plural solenoid-operated actuators are in the overheat state for informing the rescuer of the solenoid-operated actuator in the overheat state.

BRIEF DESCRIPTION OF THE DRAWINGS

The features and advantages of the automatic player musical instrument, automatic player and overheat protector will be more clearly understood from the following description taken in conjunction with the accompanying drawings, in which FIGS. 5A to 5C are views showing a mean current table in different situation, FIG. 6 is a view showing the system configuration of an automatic playing system incorporated in another automatic player piano of the present invention, FIG. 7 is a view showing the system configuration of an automatic playing system incorporated in yet another automatic player piano of the present invention.

DESCRIPTION OF THE PREFERRED EMBODIMENTS

Figure 1:
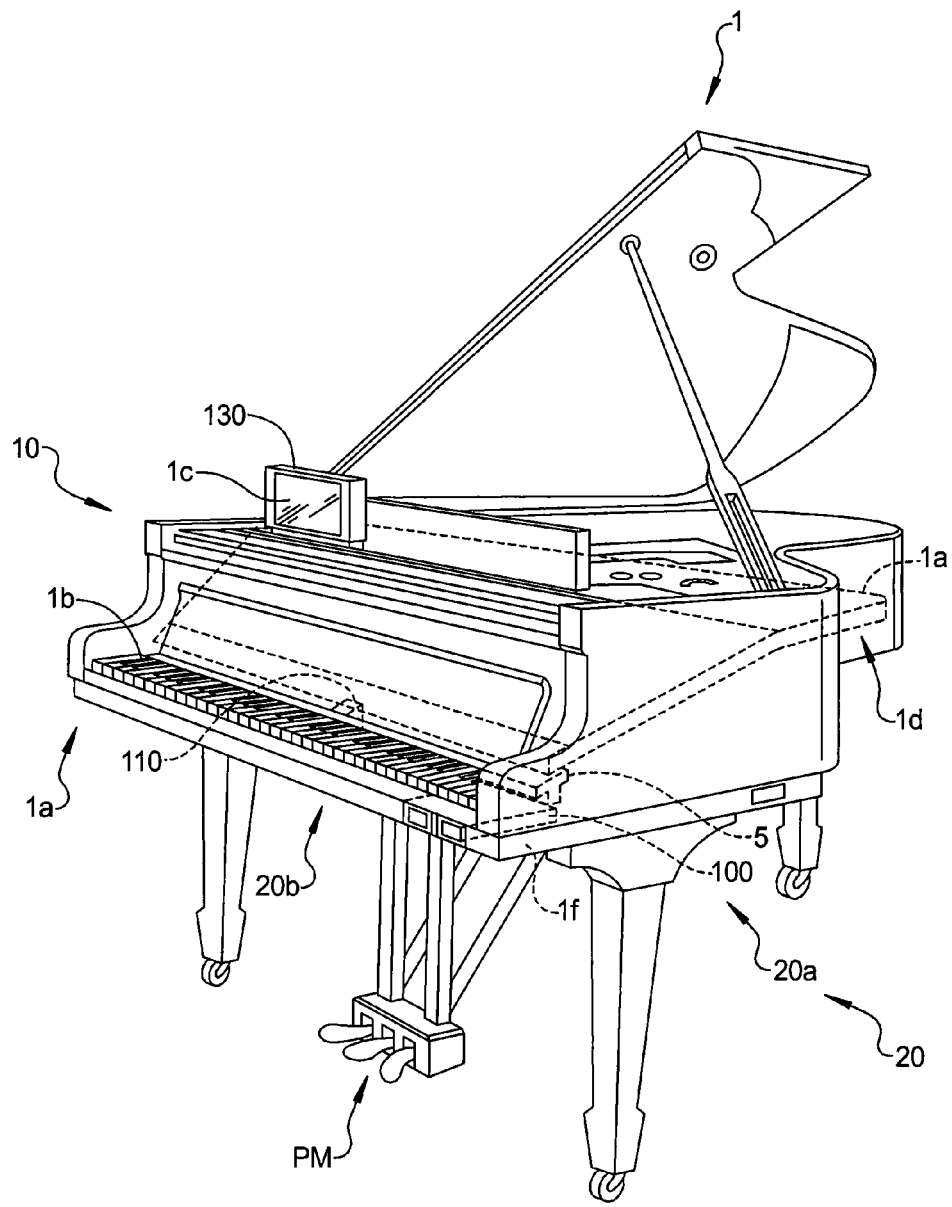
FIG. 1 is a perspective view showing the external appearance of an automatic player piano of the present invention.

An automatic player musical instrument embodying the present invention is adapted to produce tones through and without fingering of a human player, and largely comprises plural manipulators, a mechanical tone generator and an automatic player. The plural manipulators are selectively moved by the human player and automatic player for specifying an attribute of the tones. The attribute may be the pitch of tones to be produced or effects to be imparted to the tones. The plural manipulators are connected to the mechanical tone generator. The mechanical tone generator is adapted to produce the tones at the specified attribute.

The automatic playing system is connected to the plural manipulators, and includes plural solenoid-operated actuators, an automatic player and an overheat protector. The plural solenoid-operated actuators are selectively energized with a driving signal by the automatic player for the automatic performance, and the overheat protector prevents the solenoid-operated actuators from overheat state.

The plural solenoid-operated actuators are provided in association with the plural manipulators, respectively, so as to give rise to the movements of plural manipulators without the fingering of human player, and have a critical temperature. While the plural solenoid-operated actuators are moving the plural manipulators below the critical temperature, the plural solenoid-operated actuators are free from undesirable damage, and runs during a time period guaranteed by the manufacturer. However, if any one of or ones of the plural solenoid-operated actuators run over the critical temperature, the solenoid-operated actuator or solenoid-operated actuators are overheated, and are seriously damaged before the time period guaranteed by the manufacturer under the overheated state.

The automatic player is a sort of computer architecture. While a computer program for the automatic performance is running, a set of music data codes, which represents a music tune, is analyzed, and produces the driving signal in accordance with pieces of music data expressed by the music data codes. The driving signal is selectively supplied from the automatic player to the plural solenoid-operated actuators. The solenoid-operated actuators are responsive to the driving signal so as to give rise to the movements of associated manipulators without the fingering of the human player.

The overheat protector has a temperature sensor, a rescuer and an information processor. The temperature sensor and automatic player are connected in parallel to the information processor, which in turn is connected to the rescuer.

The temperature sensor is provided in the vicinity of the plural solenoid-operated actuators, and produces a temperature detecting signal. The temperature detecting signal is representative of an environmental temperature around the plural manipulators. The information processor acquires the environmental temperature through the temperature detecting signal.

The rescuer is provided for the plural solenoid-operated actuators. When the information processor finds one of or ones of the plural manipulators to be in the overheat state, the rescuer makes the plural solenoid-operated actuators recovered from overheat state.

The information processor is a sort of computer architecture, and a computer program runs thereon. While the computer program is running on the information processor, a temperature rise estimator, a solenoid-temperature estimator and an overheat detector are realized.

In detail, the temperature rise estimator estimates a temperature rise of the plural solenoid-operated actuators on the basis of the amount of current of the driving signal passing through the solenoid-operated actuators. The solenoid temperature estimator estimates a solenoid temperature of the plural solenoid-operated actuators on the basis of the temperature rise and the environmental temperature. The overheat detector compares the solenoid temperature with the critical temperature to see whether or not the plural solenoid-operated actuators are in the overheat state.

While the plural solenoid-operated actuators are running below the critical temperature, the overheat detector stands idle, and permits the automatic player selectively to energize the plural solenoid-operated actuators for the automatic performance. However, when the overheat detector finds one of or ones of the plural solenoid-operated actuators to be in the overheat state, the overheat detector informs the rescuer of the overheated solenoid-operated actuators. Then, the rescuer makes the plural solenoid-operated actuators recovered from overheat state.

As will be understood from the foregoing description, the overheat protector takes the environmental temperature into account so that the decision of overheat protector is reliable.

Moreover, the temperature rise estimator, solenoid temperature estimator and overheat detector are realized through the execution of computer program. The circuit configuration of overheat protector is simpler than that of the prior art so that the manufacturer can reduce the production cost of the overheat protector.

In the following description, term "front" is indicative of a position closer to a human player, who sits on a stool for fingering, than another position modified with term "rear", and a "fore-and-aft" direction extends along a line drawn between a front position" and a corresponding rear position. A "lateral direction" crosses the fore-and-aft direction at right angle, and an "up-and-down" direction is normal with a plane defined by the fore-and-aft direction and lateral direction. "Right" and "left" are determined from the viewpoint of the human player.

First Embodiment

Referring first to FIG. 1 of the drawings, an automatic player piano 1 embodying the present invention largely comprises an acoustic piano 10 and an automatic playing system 20. The acoustic piano 10 has a keyboard 1a, which includes black keys 1b and white keys 1c, cabinet 1d and a mechanical tone generator 1e. The keyboard 1a is mounted on a front portion of the cabinet 1d, and is exposed to a human player. The mechanical tone generator 1e is housed in the cabinet 1d, and the keyboard 1a is connected to the mechanical tone generator 1e. While a human player is depressing and releasing the black keys 1b and white keys 1c, the depressed keys 1b and 1c activate the mechanical tone generator 1e so that the acoustic tones are produced through the acoustic tones, and the released keys 1b and 1c deactivate the mechanical tone generator 1e so that the acoustic tones are decayed. Thus, the acoustic piano 10 is responsive to fingering of a human player on the keyboard 1a so as to produce acoustic tones.

The automatic playing system 20 is installed inside the acoustic piano 10, and is activated with electric power. The automatic playing system 20 is broken down into an automatic player 20a and an overheat protector 20b. The automatic performance is realized through the automatic player 20a, and the overheat protector 20b prevents the automatic player 20a from overheat.

While music data codes are being processed in the automatic player 20a, the black keys 1b and white keys 1c are selectively depressed and released without the fingering of human player for reenacting a performance. The music data codes express pieces of music data for the automatic performance. The overheat protector 20b monitors the automatic player 20a to see whether or not the automatic player 20a is overheated. When the overheat protector 20b finds that the automatic player 20a is overheated, the overheat protector 20b deactivates the automatic player 20a so as to prevent the automatic player 20a from damage.

In this instance, most of the function of the overheat protector 20b is realized through the execution of a computer program so that the number of components is less than that of the prior art overheat protector.

Moreover, a data processing facility is shared between the automatic player 20a and the overheat protector 20b so that the automatic playing system 20 is prevented from overheat without serous increase of the system components.

The Structure of Acoustic Piano

Figure 2:
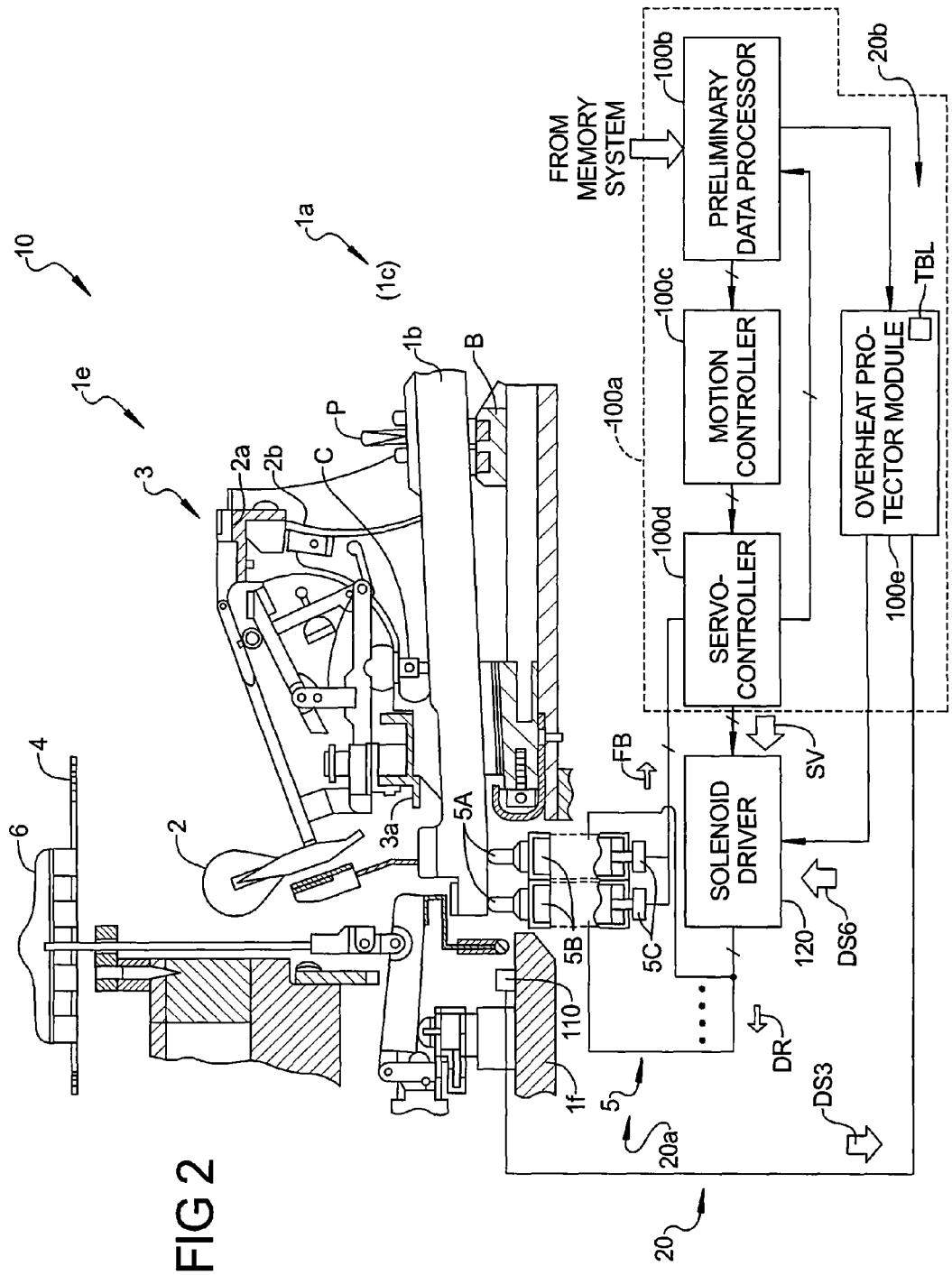
FIG. 2 is a side view showing the structure of a mechanical tone generator incorporated in the automatic player piano.

Turning to FIG. 2, the mechanical tone generator 1e includes hammers 2, action units 3, strings 4, dampers 6 and pedal mechanisms PM. Most of the front portions of keys 1b and 1c are not drawn in FIG. 2. The hammers 2 are respectively associated with the keys 1b and 1c of the keyboard 1e, and the action units 3 are provided in association with the keys 1b and 1c and hammers 3. The strings 4 are respectively associated with the hammers, and the dampers are respectively provided in association with the keys 1b and 1c and strings 4.

As described hereinbefore, the black keys 1b and white keys 1c are incorporated in the keyboard 1a, and the total number of keys 1b and 1c is eighty-eight in this instance. The keys 1b and 1c are specified with a key number Kn, and the key number Kn is varied from 1 to 88. The eighty-eight keys 1b and 1c are arranged in the lateral direction, which is in parallel to a normal direction with respect to the sheet of paper where FIG. 2 is drawn.

The black keys 1b and white keys 1c have respective balance pins P and respective capstan screws C. The balance pins P upwardly project from a balance rail B, which laterally extends on a key bed 1f of the cabinet 1d, through the intermediate portions of keys 1b and 1c, and offer fulcrums to the associated keys 1b and 1c. When the front portions of keys 1b and 1c are depressed, the front portions of keys 1b and 1c are rotated about the balance rail B, and are sunk. On the other hand, the rear portions of keys 1b and 1c are lifted. When a human player or the automatic player 20a removes force from the keys 1b and 1c, the front portions of keys 1b and 1c are moved to be spaced from the key bed 1d by the longest distance, and the keys 1b and 1c reach rest positions. On the other hand, when the human player or the automatic player 20a exerts the force on the keys 1b and 1c, the front portions of keys 1b and 1c are moved in the opposite direction, and the keys 1b and 1c reach end positions. Term "depressed key" means the key 1b or 1c moved toward the end position, and term "released key" means the key 1b or 1c moved toward the rest position.

The hammers 2 are arranged in the lateral direction, and are rotatably supported by a hammer flange rail 2a, which in turn is supported by action brackets 2b. The action brackets 2b stands on the key bed 1f, and keep the hammers 2 over the rear portions of associated black keys 1b and the rear portions of associated white keys 1c.

The action units 3 are respectively provided between the keys 1b and 1c and the hammers 2, and are rotatably supported by a whippen rail 3a. The whippen rail 3a laterally extends over the rear portions of black keys 1b and the rear portions of white keys 1c, and is supported by the action brackets 2b. The action units 3 are held in contact with the capstan screws C of the associated keys 1b and 1c so that the depressed keys 1b and 1c give rise to rotation of the associated action units 3 about the whippen rail 3a. While the action units 3 are rotating about the whippen rail 3a, the rotating action units 3 force the associated hammers 2 to rotate until escape between the action units 3 and the hammers 2, and the hammers 2 starts free rotation toward the associated strings 4 at the escape. The detailed behavior of action units 3 is same as that of a standard grand piano, and, for this reason, no further description is incorporated for the sake of simplicity.

The strings 4 are stretched over the associated hammers 2, and are designed to produce the acoustic tones at difference in pitch from one another. The hammers 2 are brought into collision with the associated strings 4 at the end of free rotation, and give rise to vibrations of the associated strings 4 through the collision.

The loudness of acoustic tones is proportional to the final hammer velocity immediately before the collision, and the final hammer velocity is proportional to the key velocity at a reference point, which is a particular key position on the loci of keys 1b and 1c. The key velocity at the reference point is hereinafter referred to as "reference key velocity". In the standard performance, the human player regulates the finger force exerted on the keys 1b and 1c to an appropriate value so as to impart the reference key velocity to the keys 1b and 1c. Similarly, the automatic player 20a regulates the electromagnetic force exerted on the keys 1b and 1c to the appropriate value in the automatic performance.

The dampers 6 are connected to the rearmost portions of associated keys 1b and 1c, and are spaced from and brought into contact with the associated strings 4. While the associated keys 1b and 1c are staying at the rest positions, the rearmost portions of keys 1b and 1c do not exert force on the dampers 6 in the upward direction so that the dampers 6 are held in contact with the associated strings 4. The dampers 6 do not permit the strings 4 to vibrate. While a human player or the automatic player 20a is depressing the keys 1b and 1c, the rearmost portions of keys 1b and 1c start to exert the force on the associated dampers 6 on the way to the end positions, and, thereafter, cause the dampers 6 to be spaced from the associated strings 4. When the dampers 6 are spaced from the associated strings 4, the strings 4 get ready to vibrate. The hammers 2 are brought into collision with the strings 4 after the dampers 6 have been spaced from the strings 4. The acoustic tones are produced through the vibrations of strings 4. When the human player or the automatic player 20a releases the depressed keys 1b and 1c, the released keys 1b and 1c start to move toward the rest positions, and the dampers 6 are moved in the downward direction due to the self-weight of dampers 6. The dampers 6 are brought into contact with the strings 4 on the way to the rest positions, and make the vibrations of strings 4 and, accordingly, acoustic tones decayed.

The pedal mechanisms PM are selectively connected to the dampers 6 and keyboard 1a, and a human player steps on the pedals of pedal mechanisms PM for imparting artificial expression to the acoustic tones. The pedals are called as "damper pedal", "soft pedal" and "sostenuto pedal". The damper pedal or sostenuto pedal make all of the dampers 6 or selected one of ones of dampers 6 spaced from the associated strings 4 so that the acoustic tone or tones are prolonged. On the other hand, the soft pedal makes the hammers 2 laterally slightly moved so that the hammers 2 are brought into collision with the reduced number of wires of associated strings 4. As a result, the loudness of acoustic tones is lessened.

The System Configuration of Automatic Playing System

Turning back to FIG. 1, the automatic playing system 20 includes a controller 100, an array of solenoid-operated actuators 5, a temperature sensor 110 and a man-machine interface 130. Though not shown in the drawings, solenoid-operated actuators are further provided in association with the pedals. However, the solenoid-operated actuators for the pedals are deleted from the drawings for the sake of simplicity.

The number of solenoid-operated actuators 5 for the keyboard 1a is equal to the number of keys 1b and 1c so that the solenoid-operated actuators 5 for the keyboard 1a are also specified with the key number Kn from 1 to 88.

In this instance, a touch screen serves as the man-machine interface 130, and, for this reason, the touch screen is also labeled with reference sign 130 in the following description. The controller 100 supplies a digital video signal DS1 representative of pieces of video data to the touch screen 130, and video images are produced on the touch screen 130. The video images are a list of jobs, a prompt message, a current status massage, a list of options and so forth. Users give instructions to the controller 100 by selectively pressing the video images. When a user presses a certain video image on the touch screen 130, the touch screen 130 produces a digital instruction signal DS2 representative of the area where the user presses, and supplies the digital instruction signal DS2 to the controller.

The solenoid-operated actuators 5 are provided below the rear portions of keys 1b and 1c, respectively, and the touch screen 130 is provided on the cabinet 1d beside a music rack. The controller 100 is embedded in the key bed 1f, and the front panel of controller 100 is exposed to users. The temperature sensor 110 is provided on the key bed 1f in the vicinity of the solenoid-operated actuator 5, which is associated with the forty-fourth key from the rightmost key. The environmental temperature around the array of solenoid-operated actuators 5 is monitored with the temperature sensor 110.

A temperature-to-current converter and an analog-to-digital converter form in combination the temperature sensor 110. Various sorts of temperature-to-current converters are sold in the market. Examples of the temperature-to-current converters are known as a thermo-coupler, a resistance detecting element and a thermistor. In this instance, a thermistor is employed as the temperature-to-current converter from the viewpoint of durability.

The temperature-to-current converter makes the amount of current varied together with the environmental temperature, and the amount of current flows from the temperature-to-current converter to the analog-to-digital converter. The analog-to-digital converter samples the discrete value of the voltage expressing the amount of current, and produces a digital temperature detecting signal DS3. The discrete value is varied together with the environmental temperature around the array of solenoid-operated actuators 5. The digital temperature detecting signal DS3 is representative of the sampled discrete value of the environmental temperature, and is supplied to the controller 100.

Figure 3:
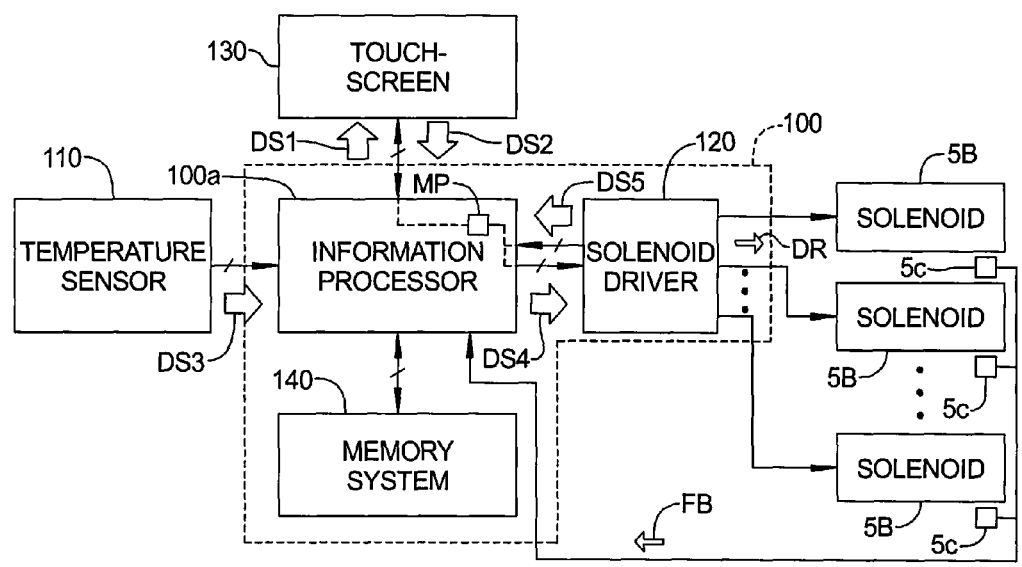
FIG. 3 is a block diagram showing the system configuration of an automatic player incorporated in the automatic player piano.

Turning to FIG. 3 of the drawings, the touch-screen 130, temperature sensor 110 and solenoid-operated actuators 5 are connected to the controller 100. The controller 100 includes an information processor 100a, a solenoid-driver 120 and a memory system 140. The information processor 100a is connected to the solenoid driver 120 and memory system 140 through a bus system.

Each of the solenoid-operated actuators includes a plunger 5A, a solenoid 5B and a built-in plunger sensor 5C as shown in FIG. 2. The solenoid driver 120 is connected to the solenoids 5B, and selectively supplies a driving signal DR to the solenoids 5B. In other words, the solenoid-operated actuators 5 are energized with the driving signal DR. In this instance, the solenoid driver 120 regulates the amount of mean current of the driving signal DR to a proper value for imparting the reference key velocity to each of the keys 1b and 1c to be depressed. A pulse width modulator is, by way of example, available for the solenoid driver 120. The amount of mean current is varied together with the pulse width so that the information processor 100a supplies a digital control signal DS4, which is representative of a target value of magnetic force to be applied to the target key 1b or 1c.

The built-in plunger sensors 5C monitor the associated plungers 5B, and produce a feedback signal FB representative of the velocity of plungers 5B. The feedback signal FB is supplied from the built-in plunger sensors 5C to the information processor 100a.

The information processor 100a has an information processing capability. In this instance, the information processor 100a is implemented by a microcomputer MP. The microcomputer is sold in the market as a single-chip semiconductor device where an arithmetic and logic unit, a program memory a working memory, registers, decoders, signal interfaces and other peripheral circuits are integrated on a single semiconductor chip. A microprocessor, a read only memory, a random access memory and other discrete devices are also available for the information processor 100a.

The information processor 100a has counters, and the counters are used for measuring various time periods. One of the counters is assigned to measurement of time period from the actuation or deactivation of one of or some of the solenoid-operated actuators 5 to the next actuation or deactivation of another solenoid-operated actuator or the solenoid-operated actuators. Some of the counters are assigned to timer interruptions for subroutine programs, which are hereinafter described. The counters may be implemented by software.

A computer program is stored in the program memory, and runs on the arithmetic and logic unit. The computer program is broken down into a main routine program and sub-routine programs. While the arithmetic and logic unit is reiterating the main routine program, the arithmetic and logic unit fetches pieces of position data, which ride on the digital instruction signal D2, and a piece of temperature data, which rides on the digital temperature signal DS3 from the signal interface connected to the touch screen 130. The arithmetic and logic unit determines the instruction given by the user through the touch screen 130 on the basis of the pieces of position data. The arithmetic and logic unit transfers the piece of temperature data to the working memory, and stores the piece of temperature data therein.

Figure 4:
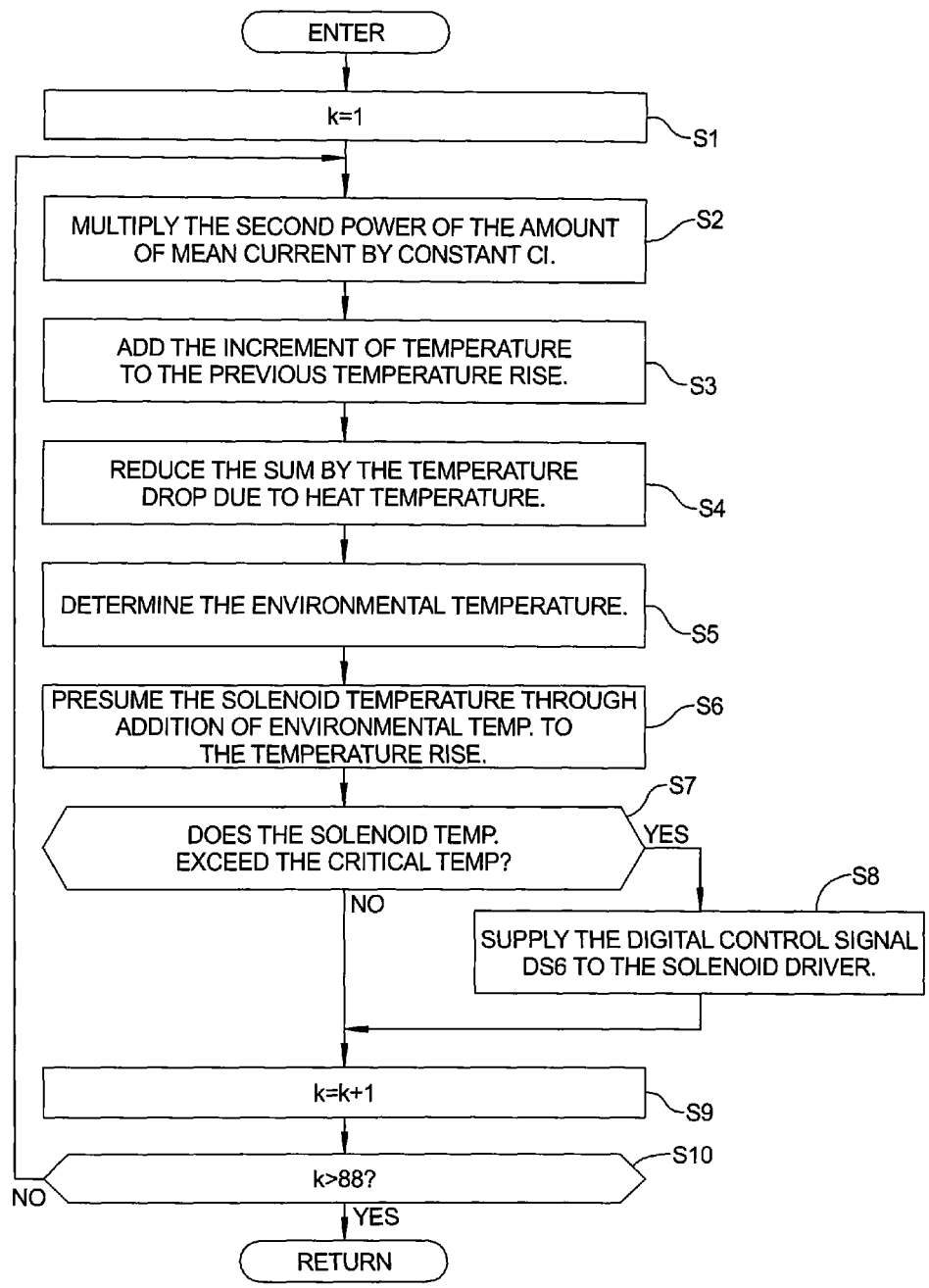
FIG. 4 is a flowchart showing a job sequence of a subroutine program assigned to an overheat protector.

One of the sub-routine programs is assigned to an automatic performance, and the main routine program periodically branches to the subroutine program for the automatic performance through the timer interruption. Another subroutine program, a job sequence of which is illustrated in FIG. 4, is assigned to overheat protection, and the main routine program and the subroutine program for the automatic performance also periodically branch to the subroutine program for the overheat protection through another timer interruption. The entry into the subroutine program for overheat protection becomes effective on the condition that the main routine program starts to branch to the subroutine program for automatic performance. In other words, the overheat protector is periodically activated for searching for an overheated solenoid-operated actuator 5. The subroutine programs are hereinlater described in detail.

The memory system 140 includes a non-volatile rewritable memory and a volatile memory such as a random access memory, and has a large data holding capacity. Various sorts of non-volatile rewritable memory are known. An example of the non-volatile rewritable memory is a semiconductor electrically erasable and programmable memory device. A value of critical temperature is stored in the non-volatile rewritable memory for the solenoid-operated actuators 5. The critical temperature is indicative of the highest temperature at which the solenoid-operated actuators 5 is operable without serious damage.

Plural music data files are further stored in the non-volatile memory of memory system 140, and a set of music data codes form each music data file. In this instance, the music data codes are prepared in accordance with the MIDI (Musical Instrument Digital Interface) protocols. Selected ones of the music data codes are called as "event data codes", and other selected ones of music data codes are called as "duration data codes". Two sorts of event data codes are called as "note-on event codes" and "note-off event codes", and the duration data codes, note-on event data codes and note-off event data codes are briefly hereinafter described.

The note-on event data code represents generation of a tone, and has a piece of music data expressing the key number Kn assigned to the key 1*b* or 1*c* to be depressed and a piece of music data expressing velocity. The velocity expresses the loudness of the tone to be produced. The note-off event data code represents decay of the tone, and has a piece of music data expressing the key number Kn assigned to the key 1*b* or 1*c* to be released. The duration data code expresses a time period between a key event, i.e., the note-on event or note-off event and the next key event. Therefore, the time at which the hammer 2 is brought into collision with the string 4 and the time at which the damper 6 is brought into contact with the vibrating string 4 are determined on the basis of the duration data codes.

The music data codes are sequentially read out from selected one of the music data files, and are transferred from the memory system 140 to the information processor 100*a*. The information processor 100*a* produces the digital control signal DS4 through the data processing along the subroutine program assigned to the automatic performance, and the digital control signal DS4 is supplied to the solenoid driver 120. The digital control signal DS4 is indicative of the destination of driving signal DR, i.e., the solenoid 5 and target amount of mean current or target pulse width. The target amount of mean current is periodically reconsidered during the projection of the plunger 5A.

In this instance, the information processor 100*a*, sub-routine program for automatic performance, solenoid driver 120, touch screen 130, memory system 140 and solenoid-operated actuators 5 form in combination the automatic player 20*a*, and the information processor 100*a*, subroutine program for overheat protection and temperature sensor 110 constitute the overheat protector 20*b*.

Subroutine Program for Automatic Performance

When a user wishes to hear a music tune through the automatic performance, he or she selects "automatic performance" from the job list. Then, the information processor 100*a* produces the visual image of the list of music tunes on the touch screen 130. The user presses a visual image expressing the music tune. The piece of position data expressing the pressed visual image is supplied to the information processor 100*a*, and the information processor 100*a* determines the music tune which the user wishes to reproduce, and transfers the music data file where the set of music data codes for the music tune is stored to the working memory. Thus, the automatic player 20*a* gets ready to perform the selected music tune on the acoustic piano 10. When the user instructs the automatic player 20*a* to start the automatic performance through the touch screen 130, the main routine program starts periodically to branch to the subroutine program for automatic performance.

The subroutine program for the automatic performance realizes functions called as a preliminary data processor 100*b*, a motion controller 100*c* and a servo controller 100*d* shown in FIG. 2. The results of data processing are relayed as indicated by arrows in the box labeled with reference sign 100*a*.

Although the music data codes are normalized for all the products of automatic player pianos, the component parts of acoustic piano 10 and solenoid-operated actuators 5 have individualities so that the music data codes are to be individualized. One of the jobs assigned to the preliminary data processor 100*b* is the individualization. Another job assigned to the preliminary data processor 100*b* is to select the event data code or event data codes to be processed for the next key event or next key events. The preliminary data processor 100*b* periodically checks the counter assigned to the measurement of duration to see what event data code or codes are to be processed. When the preliminary data processor 100*b* finds the event data code or event data codes to be processed, the preliminary data processor 100*b* transfers the event data code or event data codes to be processed to the motion controller 100*c*.

Yet another job assigned to the preliminary data processor 100*b* is to determine the amount of mean current supplied to the individual solenoid-operated actuators 5 during the activation. The amount of mean current is periodically reconsidered through the servo controller 100*d*, and, for this reason, the motion controller 100*d* supplies pieces of driving current data expressing the initial amount of mean current, increment of mean current and decrement of mean current to the preliminary data processor 100*b* through a digital information signal DS5.

A mean current table TBL is prepared for the protection from overheat, and the preliminary data processor 100*b* writes the amount of mean current in the mean current table TBL. The mean current table TBL is hereinlater described in connection with the other subroutine program for the overheat protection.

The motion controller 100*c* analyzes the event data codes for determining the key or keys 1*b* and 1*c* to be depressed or released. Thus, the motion controller 100*c* specifies the solenoid-operated actuator or actuators 5 associated with the key or keys 1*b* and 1*c* to be depressed or released.

The motion controller 100*c* further analyzes the event data code or codes and duration data codes for a reference forward key trajectory and a reference backward key trajectory. Both of the reference forward key trajectory and reference backward key trajectory are simply referred to as "reference key trajectory."

The reference forward key trajectory is a series of values of target key position varied with time for a depressed key 1b or 1c. The reference forward key trajectories are determined in such a manner that the depressed keys 1b and 1c pass through the respective reference points at target values of reference key velocity so as to give target values of final hammer velocity to the associated hammers 2. The associated hammers are brought into collision with the strings 4 at the final hammer velocity at the target time to generate the acoustic tones in so far as the keys 1b and 1c travel on the reference key trajectories.

The reference backward key trajectory is also a series of values of target key position varied with time for a released key 1b or 1c. The reference backward key trajectories are determined in such a manner that the released keys cause the associated dampers 6 to be brought into contact with the vibrating strings 4 at time to delay the acoustic tones.

The reference forward key trajectory and reference backward key trajectory are known to persons skilled in the art, and, for this reason, no further description is hereinafter incorporated for the sake of simplicity.

The reference key trajectories may be calculated for each of the depressed keys 1b and 1c and each of the released keys 1b and 1c or prepared in a table.

When the time to make a key 1b or 1c start to travel on the reference key trajectory comes, the motion controller 100c supplies the first value of target key position to the servo controller 100d. The motion controller 100c continues periodically to supply the other values of target key position to the servo controller 100d until the keys 1b and 1c reaches the end of reference key trajectories.

The feedback signal FB expresses actual plunger velocity, i.e., actual key velocity, and is periodically fetched by the servo controller 100d for each of the keys under the travel on the reference key trajectories. The servo controller 100d determines the actual key position on the basis of the series of values of actual key velocity. The servo controller 100d further determines the target key velocity on the basis of the series of values of target key position. The servo controller 100d calculates the difference between the actual key velocity and the target key velocity and the difference between the actual key position and the target key position, and instructs the solenoid driver 120 to regulate the amount of mean current to an appropriate value through a digital servo control signal SV so as to minimize the differences. The servo controller 100d informs the solenoid driver 120 of the increment, decrement of preservation together with the key number Kn indicative of the destination of the driving signal DR through the servo control signal SV.

One of the keys 1b and 1c is assumed to be depressed in the automatic performance. The motion controller 100c determines the reference forward key trajectory for the key 1b or 1c, and informs the servo controller 100d of the reference forward key trajectory. The servo controller 100d determines the initial value of the amount of mean current, and supplies the piece of control data expressing the initial value of amount of mean current to the solenoid driver 120 through the digital control signal DS4. The servo controller 100d further supplies the piece of control data expressing the initial value to the preliminary data processor 100b. After the small amount of time interval, the servo controller 100d determines the difference between the actual key position and the target key position and the difference between the actual key velocity and the target key velocity, and calculates the increment of the amount of mean current for the delayed key 1b or 1c and the decrement of the amount of mean current for the key 1b or 1c in advance. The piece of control data expressing the increment or decrement is supplied to the solenoid driver 120, and the solenoid driver 120 increases or decreases the amount of mean current. The servo controller 100d further informs the preliminary data processor 100b of the increment and decrement through the digital information signal DS5.

The servo controller 100d periodically repeats the above-described job for the key 1b or 1c until the key 1b or 1c reaches the end of reference forward key trajectory, and calculates the differences so as to determine the increment, decrement or preservation. After each determination of the increment, decrement or preservation, the servo controller 100d periodically informs the solenoid driver 120 and preliminary data processor 100b of the increment, decrement or preservation through the digital control signal DS4 and digital information signal DS5. As a result, the key 1b or 1is forced to travel on the reference forward key trajectory, and makes the associated hammer 2 brought into collision with the string 4 at the time to generate the acoustic tone at the target loudness. The preliminary data processor 100b determines the amount of mean current on the basis of the initial value, increment and decrement, and writes the amount of mean current in the mean current table TBL.

Subroutine Program for Overheat Protection

The subroutine program for the overheat protection runs on the arithmetic and logic unit. While the subroutine program for the overheat protection is running on the arithmetic and logic unit, the arithmetic and logic unit reiterates a job sequence shown in FIG. 4, and a function block 100e shown in FIG. 2 is realized as the result of the execution of jobs. The function block 100e is labeled with "overheat protector." The overheat protector module 100e periodically checks the mean current table TBL to see whether or not the driving signal DR makes the solenoid 5B of any one of the solenoid-operated actuators 5 rise in temperature over a critical value. When the overheat protector module 100e finds the high temperature solenoid 5B over the critical value, the overheat protector module 100e supplies a digital control signal DS6 to the solenoid driver 120, and instructs the solenoid driver 120 to stop the driving signal DR so as to prevent the overheated solenoid-operated actuator 5 from serious damage.

First, the description is made on the mean current table TBL with reference to FIG. 5A. The mean current table TBL has four columns, and the four columns are respectively labeled with "solenoid", "mean current", "increment of temperature" and "temperature rise". While the automatic playing system 20 is being initialized immediately after power-on, an initial value "0" is written in the second, third and fourth columns.

The numerals "1", "2", "3", . . . "88" are indicative of the key numbers Kn assigned to the associated keys 1b and 1c so that each of the solenoids 5B are specified with the numeral in the first column.

The amount of mean current presently flowing through the solenoids 5B is written in the second column by means of the preliminary data processor 100b. The preliminary data processor 100b writes zero into the second column for the solenoid-operated actuators 5 in stand-idle, and writes the amount of mean current in the second column for the solenoid-operated actuators 5 energized with the driving signal DR. The preliminary data processor 100b periodically determines the amount of mean current on the basis of the initial value, increment and decrement. In case where the driving signal DR flows the solenoid 5B assigned to the keys labeled with the key number "2", the preliminary data processor 100b determines that the amount of mean current is a21, and writes the amount of mean current a21 in the second row.

If the amount of mean current indicated in the second column flows through the solenoids 5B for the time period equal to the time intervals between the previous timer interruption and the present timer interruption, the solenoids 5B are expected to rise in temperature by values equal to the "increment of temperature". The values of increment are written in the third column. The increment of temperature bmn is given as $$bmn = C1 \times amn2 \qquad \text{Equation 1}$$

where mn is the key number Kn, amn is the amount of mean current and C1 is a constant. The constant C1 expressing a relation between the amount of mean current and a temperature rise, and is determined through an experiment or a suitable simulation. For example, the amount of mean current is a21, the increment of temperature b21 is given as the product between the constant C1 and the second power of the amount of mean current a2.

The temperature rise is the present temperature, which is determined through presumption on the basis of the series of values of the increment of temperature. In the presumption, the heat radiation from the solenoids 5B is taken into account, and the temperature rise cmn is given as $$cmn = (cmn' + bmn) \times C2 \qquad \text{Equation 2}$$

where mn is equal to the key number Kn, cmn' is the temperature rise in the previous execution and C2 is a constant for heat radiation. The constant C2 expresses a rate of reduction of temperature, and is determined through an experiment or a simulation. The constant is less than 1. As a result, the temperature rise cmn becomes less than the sum of the previous value of temperature rise and the increment of temperature. For example, the temperature rise c21 is given as the product between the constant and the sum of a21 and b21. The temperature rise cmn is indicative of the total temperature rise from the initiation of automatic performance.

Assuming now that the arithmetic and logic unit enters the subroutine program for overheat protection, the preliminary data processor 100b has written the finite value a21 of the amount of mean current in the mean current table TBL for the solenoid "2", and zero for the other solenoids "1", "3", . . . and "88" as shown in FIG. 5A. The critical temperature was transferred from the memory system 140 to the working memory during the initialization of automatic playing system upon the request for automatic performance.

Upon entry into the subroutine program for overheat protection, the arithmetic and logic unit firstly set "1" to an index register k as by step S1. The index register k is indicative of the solenoid-operated actuator 5 under the inspection. The index "1" is indicative of the solenoid-operated actuator 5 associated with the key number "1".

The arithmetic and logic unit reads out the amount of mean current of the solenoid 5B labeled with the number "1" from the mean current table TBL, and raises the amount of mean current to the second power. Subsequently, the arithmetic and logic unit multiplies the second power of the amount of mean current by the constant C1 as by step S2. The product is indicative of the increment of temperature. The amount of mean current of the solenoid 5B labeled with "1" is zero so that the arithmetic and logic unit writes zero into the third column of mean current table TBL for the solenoid 5 labeled with "1".

Subsequently, the arithmetic and logic unit reads out the previous temperature rise "0" from fourth column of mean current table TBL, and adds the increment of temperature "0" to the previous temperature rise "0". The sum of previous temperature rise and increment of mean current is indicative of the present temperature rise. Since both of the previous temperature rise and increment of temperature are zero, the sum is also zero.

Subsequently, the arithmetic and logic unit multiplies the sum of previous temperature rise and increment of temperature by the constant C2. As described hereinbefore, the temperature drop due to the heat radiation is taken into the constant C2 so that the temperature rise is reduced by the temperature drop due to the heat radiation as by step S4. The product between the sum and constant C2 is indicative of the temperature rise in consideration of the heat radiation. The arithmetic and logic unit writes zero into the fourth column of mean current table TBL for the solenoid 5B labeled with "1".

Subsequently, the arithmetic and logic unit reads out the piece of temperature data from the working memory as by step S5. The piece of temperature data expresses the environmental temperature around the array of solenoid-operated actuators 5. The arithmetic and logic unit adds the temperature rise to the environmental temperature so as to presume the temperature of solenoid 5B labeled with "1" as by step S6.

Subsequently, the arithmetic and logic unit reads out the value of critical temperature from the working memory, and compares the value of solenoid temperature with the value of critical temperature as by step S7.

When the solenoid-operated actuator 5 labeled with "1" is staying below the critical temperature, the answer at step S7 is given to negative "NO", and the arithmetic and logic unit proceeds to step S9. On the other hand, if the solenoid-operated actuator 5 labeled with "1" is overheated, the answer at step S7 is given affirmative "YES", and the arithmetic and logic unit supplies the digital control signal DS6 to the solenoid driver 120 as by step S8. The digital control signal DS6 makes solenoid driver 120 disabled for the overheated solenoid-operated actuator 5, i.e., not respond to the digital control signal SV for the overheated solenoid-operated actuator 5. In other words, the digital control signal DS6 has the priority over the servo control signal SV. When the solenoid driver 120 is disabled for the overheated solenoid-operated actuator 5 with the digital control signal DS6, the driving signal DR is decayed to default value, i.e., zero. In other words, the driving signal DR, which is to be supplied with the overheated solenoid-operated actuator 5, is zero in the amount of mean current.

When the solenoid-operated actuator 5 under the inspection is not overheated, the arithmetic and logic unit increments the index k by one at step S9. After step S9, the arithmetic and logic unit compares the present value of index k with the maximum value "88" to see whether or not the all of the solenoid-operated actuators 5 have been inspected as by step S10. The index k is presently "1". The index k is incremented to "2" at step S9. For this reason, the answer at step S10 is given negative "NO", and the arithmetic and logic unit returns to step S2. However, when all of the solenoid-operated actuators 5 were inspected, the answer at step S10 is given affirmative "YES", and the arithmetic and logic unit returns to the main routine program.

Since the index k is 2 upon completion of the inspection on the solenoid 5B labeled with "1", the arithmetic and logic unit returns to step S2, and reads out the amount of mean current a21 from the mean current table TBL. The arithmetic and logic unit raises the amount of mean current a21 to the second power, and multiplies the second power of amount of mean current a21 by the contact C1 to determine the increment of temperature b21 at step S2. The increment of temperature b21 is written in the third column of mean current table TBL for the solenoid 5B labeled with "2" as shown in FIG. 5A.

Subsequently, the arithmetic and logic unit reads out the previous temperature rise of zero from the mean current table TBL (see FIG. 5A), and adds the increment of temperature b21 to the previous temperature rise "0" at step S3. The sum is equal to b21. The arithmetic and logic unit multiplies the sum by the constant C2. The product is indicative of the present value of temperature rise. The present value of temperature rise is written in the fourth column of mean current table for the solenoid labeled with "2".

The arithmetic and logic unit fetches the environmental temperature from the working memory at step S5, and presumes the solenoid temperature at step S6. The arithmetic and logic unit compares the solenoid temperature with the critical temperature at step S7, and proceeds to step S8 or steps S9 and S10 depending upon the answer at step S7. In this way, the arithmetic and logic unit reiterates the loop consisting of steps S2 to S10 until the answer at step S10 is given affirmative "YES" so as to inspect all of the solenoid-operated actuators 5.

The key 1b or 1c labeled with the key number "2" is assumed to return to the rest position. The amount of current supplied to the associated solenoid 5B is reduced to zero, and the previous temperature rise c21 is held in the fourth column as shown in FIG. 5B. In this situation, the arithmetic and logic unit enters the subroutine program for overheat protection. When the index is increment to "2", the arithmetic and logic unit determines the increment of temperature to be zero at step S1. The sum of increment of temperature and the previous temperature rise is equal to the previous temperature rise c21. The arithmetic and logic unit multiplies the sum by the contact C2 at step S4. Since the constant C2 is less than 1, the solenoid temperature is reduced to c22 by the temperature drop due to the heat radiation. Thus, the constant C2 makes the temperature rise gradually reduced. The arithmetic and logic unit writes c22 in the fourth column of mean current table TBL for the solenoid 5B labeled with "2".

If the solenoid-operated actuator for the key labeled with the key number 2 is repeatedly depressed and released, the solenoid temperature is drastically increased. In this situation, the arithmetic and logic unit is assumed to enter the subroutine program for overheat protection. In the mean current table TBL, the amount of mean current a23 and previous temperature rise c23 were written for the second and fourth columns for the solenoid 5B labeled with "2" as shown in FIG. 5C.

When the index k is incremented to "2", the answer at step S10 is given negative "NO", and the arithmetic and logic unit returns to step S2. The arithmetic and logic unit raises the amount of mean current a23 to the second power, and multiplies the second power by the constant C1 for the increment of temperature at step S2. The increment of temperature b23 is written in the third column for the solenoid 5B labeled with "2".

Subsequently, the arithmetic and logic unit multiplies the increment of temperature b23 by the constant C2 at step S4. The temperature rise is equal to the product, and the arithmetic and logic unit writes the temperature rise c24 in the fourth column for the solenoid 5B labeled with "2".

The arithmetic and logic unit adds the environmental temperature to the temperature rise c24 so as to determine the solenoid temperature. Either of or both of the temperature rise c24 and environmental temperature have a large value, the solenoid temperature exceeds the critical temperature, and the answer at step S7 is given affirmative "YES".

With the positive answer "YES" at step S7, the arithmetic and logic unit produces the digital control signal DS6 expressing the solenoid-operated actuator 5 labeled with "2" and amount of mean current of zero, and supplies the digital control signal DS6 to the solenoid driver 120. Since the digital control signal DS6 has the priority over the servo control signal, even if the servo controller 100d instructs the solenoid driver 120 to preserve or increase the amount of mean current for the overheated solenoid-operated actuator 5, the solenoid driver 120 ignores the servo control signal SV, and keeps the amount of current of driving signal DR zero.

As will be appreciated from the foregoing description, the overheat protector module 100e presumes the solenoid temperature for the individual solenoid-operated actuators 5 through the subroutine program for overheat protection. The information processor 100a and temperature sensor 110 are shared among all of the solenoid-operated actuators 5. In other words, the manufacturer does not need to prepare any individual electric circuits and any individual sensors. As a result, the system configuration for the overheat protector module 100e is much simpler than that of the prior art.

Moreover, the environmental temperature is measured by means of the temperature sensor 110, and the constant C2 is determined through the experiment or simulation. Although the prior art system merely takes the amount of current passing through the load into account, the overheat protector module 100e of the present invention takes not only the amount of current flowing through the individual solenoids 5B but also the environmental temperature and temperature drop due to the heat radiation into account. For this reason, the presumed solenoid temperature is closed to the actual solenoid temperature, and the overheat protector module 100e is reliable for the automatic player 20a.

Furthermore, the information processor 100a is shared between the automatic player 20a and the overheat protector 20b. In other words, only the subroutine program for overheat protection and temperature sensor 110 are newly added to the prior art automatic player. Thus, the manufacturer prevents the automatic player 20a from overheat without serious increment of manufacturing cost.

Second Embodiment

Turning to FIG. 6 of the drawings, another automatic player piano 1A largely comprises an acoustic piano 10A and an automatic playing system 20A, and the automatic playing system 20A is broken down into an automatic player 20Aa and an overheat protector 20Ab. The acoustic piano 10A is similar in construction to the acoustic piano 10 so that component parts of acoustic piano 10A are labeled with references same as those designating the corresponding component parts of acoustic piano 10 without detailed description.

The automatic playing system 20A is different from the automatic playing system 20 in that information processors 100Aa and 100Ab are respectively prepared for the automatic player 20Aa and overheat protector 20Ab. The other system components are same as those of the automatic playing system 20, and are labeled with references same as those designating corresponding system components without detailed description.

The main routine program and subroutine program for automatic performance run on the information processor 100Aa, and realizes the preliminary data processor 100b, motion controller 100c and servo controller 100d. A difference is the memory system 140 shared between the information processors 100Aa and 100Ab. The music data files are selectively supplied from the non-volatile memory of memory system 140 to the information processor 100Aa for automatic performance, and the automatic performance is carried out through the above-described functions, the preliminary data processor 100b, motion controller 100c and servo controller 100d. However, the mean current table TBL is created in the volatile memory of memory system 140. For this reason, the preliminary data processor 100b supplies an address signal to the memory system 140, and writes the amount of mean current, increment of temperature and temperature rise in the second, third and fourth columns of the mean current table TBL.

The subroutine program for overheat protection runs on the information processor 100Ab independently of the subroutine program for automatic performance, and realizes the overheat protector module 100e.

The overheat protector module 100e of the automatic player piano 1A achieves all the advantages except for the advantage by virtue of the information processor 100a shared between the automatic player 20a and the overheat protector 20b.

Third Embodiment

Turning to FIG. 7 of the drawings, yet another automatic player piano 1B largely comprises an acoustic piano 10B and an automatic playing system 20B, and the automatic playing system 20B is also broken down into an automatic player 20Ba and an overheat protector 20Bb. The acoustic piano 10B is similar in construction to the acoustic piano 10 so that component parts of acoustic piano 10B are labeled with references same as those designating the corresponding component parts of acoustic piano 10 without detailed description.

The automatic playing system 20B is different from the automatic playing system 20 in that the overheat protector module 100e supplies the digital control signal DS6 to the automatic player 20Ba. In this instance, the digital control signal DS6 is supplied to the servo controller 100d, and the servo controller 100d instructs the solenoid driver 120 to minimize the amount of mean current to zero regardless of the feedback signal FB.

The main routine program, subroutine program for automatic performance and subroutine program for overheat protection are same as those of the automatic playing system 20, and no further description is hereinafter incorporated for avoiding undesirable repetition.

The overheat protector module 100e of the automatic player piano 1B achieves all the advantages of that of the automatic player piano 1.

Although particular embodiments of the present invention have been shown and described, it will be apparent to those skilled in the art that various changes and modifications may be made without departing from the spirit and scope of the present invention.

The acoustic piano 10 does not set any limit to the technical scope of the present invention. Various automatic player musical instruments have been proposed on the basis of other sorts of musical instrument such as, for example, a mute piano, a keyboard for finger practice, wind musical instruments and percussion musical instruments. The present invention is applicable to those automatic player musical instruments.

The overheat protector may be incorporated in other sorts of mechanical system equipped with solenoid-operated actuators. An example of the mechanical system is a pneumatic controlling system for an industrial use. The pneumatic controlling system is equipped with solenoid-operated valves, and the air conduits are selectively connected through the solenoid-operated valves. The solenoid-operated valves are liable to be overheated, and the overheat protector of the present invention presents the solenoid-operated valves from overheat.

The single temperature sensor 110 does not set any limit to the technical scope of the present invention. The plural manipulators such as keys may be divided into several groups, which are respectively monitored with several temperature sensors. In this instance, the environmental temperature raise are measured for the individual groups, and the values of environmental temperature are selectively applied to the solenoids depending upon the groups associated to which the keys belong.

The temperature sensor 110 may be located at another position appropriate to measure the environmental temperature around the array of solenoid-operated actuators 5.

The automatic player 20a may have an interface, which is connected to an external memory such as, for example, a flexible disk driver, an optical disk driver, a CD (Compact Disk) driver, a DVD (Digital Versatile Disk) driver, an opto-magnetic disk driver or an USB (Universal Serial Bus) memory. The preliminary data processor 100b may directly read out the music data codes from these sorts of external memory.

The information processor 100a may rewrite the amount of mean current to zero for the overheated solenoid-operated actuator 5 at step S8 before supplying the digital control signal DS6 to the solenoid driver 120.

The subroutine program for automatic performance may realize the preliminary data processor 100b and motion controller 100c. In other words, the servo controller 100d may be omitted from the functions of automatic player 20a. In this instance, the motion controller 100c may give the solenoid driver 120 pieces of control data expressing a target displacement of plungers 5A. The solenoid driver 120 accesses a table defining the displacement and corresponding amount of mean current, and regulates the driving signal DR to the amount of mean current read out from the table. The increment of temperature may be directly presumed from the displacement.

A sort of solenoid-operated actuators is the driving current-tomagnetic force characteristics, which are varied together with the solenoid-temperature. In case where the sort of solenoid-operated actuators is installed, the overheat protector module 100e may produce a temperature signal representative of the solenoid temperature so as to supply the temperature signal to the automatic player 20a. The automatic player 20a increases or decreases the amount of mean current of the driving signal DR depending upon the solenoid temperature.

Figure 8:
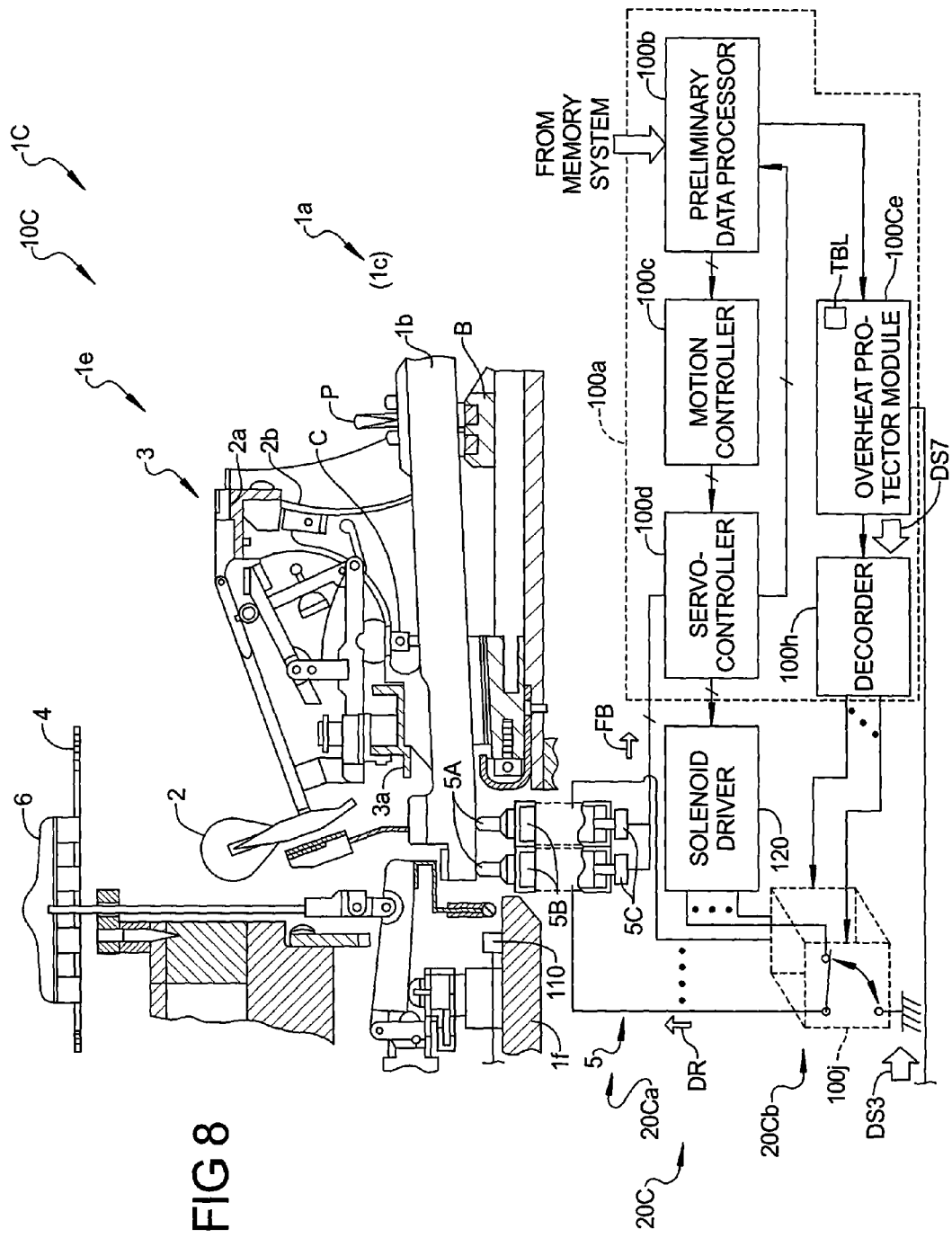
FIG. 8 is a view showing the system configuration of an automatic playing system incorporated in still another automatic player piano of the present invention.

The overheated solenoid-operated actuators 5 may be forcibly deactivated by means of a suitable electric circuit. FIG. 8 shows the first modification 1C of the automatic player piano 1. The automatic player piano 1C largely comprises an acoustic piano 10C and an automatic playing system 20C, and the automatic playing system 20C is also broken down into an automatic player 20Ca and an overheat protector 20Cb. The acoustic piano 10C and automatic player 20Ca are similar in configuration to the acoustic piano 10 and automatic player 20a, and, for this reason, component parts of acoustic piano 10C and system components of automatic players 20Ca are labeled with references same as those designating the corresponding components of acoustic piano 10 and corresponding system components of automatic player 20a without detailed description.

The overheat protector 20Cb is similar to the overheat protector 20b except for a decoder 100h and an array of switches 100j, and, for this reason, description is focused on the decoder 100h and array of switches 100j. When the overheat protector module 100Ce finds an overheated solenoid-operated actuator 5 at step S7 the overheat protector module 100Ce produces a digital control signal DS7 representative of the number assigned to the overheated solenoid-operated actuator 5 at step S8, and supplies the digital control signal DS7 to the decoder 100h. The decoder 100h is connected through control signal lines to the array of switches 100j. The digital control signal DS7 is decoded by the decoder 100h, and the decoder 100h selectively raises the control signal lines to an active level.

Each of the switches 100j has two input nodes, an output node and a control node. One of the two input nodes is connected to associated one of the output signal lines of the solenoid driver 120, and the other input node is connected to the ground. The output node is connected to associated one of the solenoids 5B, and the control node is connected to one of the control signal lines. While the control signal lines are staying at an inactive level, the output signal lines of solenoid driver 120 are connected through the associated switches 100j to the solenoids 5B. However, when the decoder 100h raises one of or some of control signal lines to the active level, the solenoid or solenoids 5B are connected to the ground through the switch or switches 100j so as forcibly to be deactivated.

Although the decoder 100h and array of switches 100j are required for the overheat protection, the overheat protector module 100Ce is implemented by software, and the number of system components of the overheat protector 20Cb is much less than that of the prior art. Moreover, the information processor 100a is shared between the automatic player 20Ca and the overheat protector 20Cb so that the manufacture realizes the overheat protection for the automatic playing system 20C without serious increase of manufacturing cost.

Figure 9:
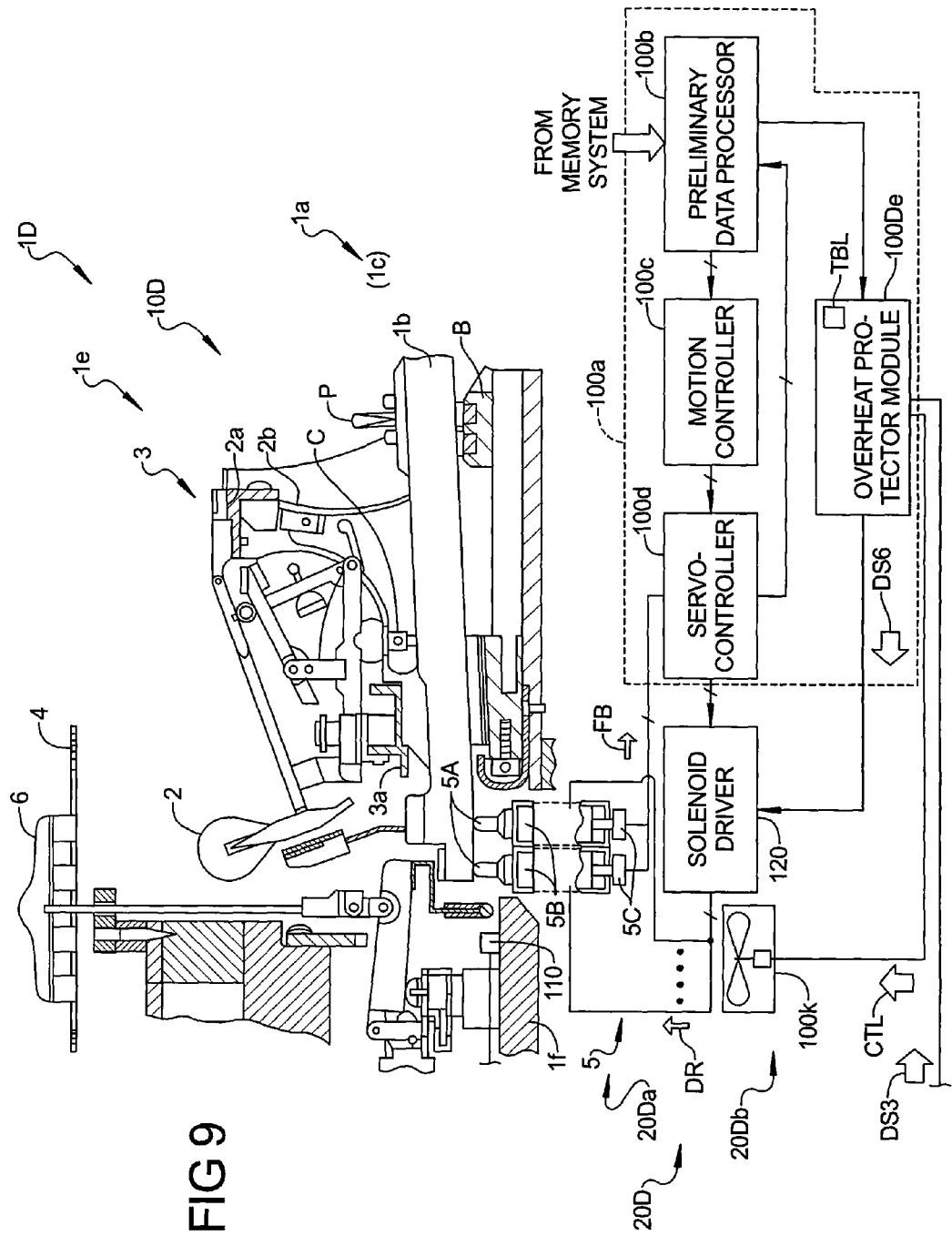
FIG. 9 is a view showing the system configuration of an automatic playing system incorporated in yet another automatic player piano of the present invention.

The overheated solenoid-operated actuators may be forcibly cooled under the control of overheat protector module 100De as shown in FIG. 9. The second modification 1D of the automatic player piano 1 largely comprises an acoustic piano 10D and an automatic playing system 20D, and the automatic playing system 20D is also broken down into an automatic player 20Da and an overheat protector 20Db. The acoustic piano 10D and automatic player 20Da are similar in configuration to the acoustic piano 10 and automatic player 20a, and, for this reason, component parts of acoustic piano 10D and system components of automatic players 20Da are labeled with references same as those designating the corresponding components of acoustic piano 10 and corresponding system components of automatic player 20a without detailed description.

The overheat protector 20Cb is similar to the overheat protector 20b except for a cooling fan 100k, and, for this reason, description is focused on the cooling fan 100k. When the overheat protector module 100De finds an overheated solenoid-operated actuator 5 at step S7 the overheat protector module 100De produces not only the digital control signal DS6 but also a control signal CTL at step S8, and supplies the digital control signal DS6 and control signal CTL to the solenoid driver 120 and cooling fan 100k at step S8. The cooling fan 100k cools down the overheated solenoid-operated actuator 5 so as to make the overheated solenoid-operated actuator 5 recovered from the overheated state.

Figure 10:
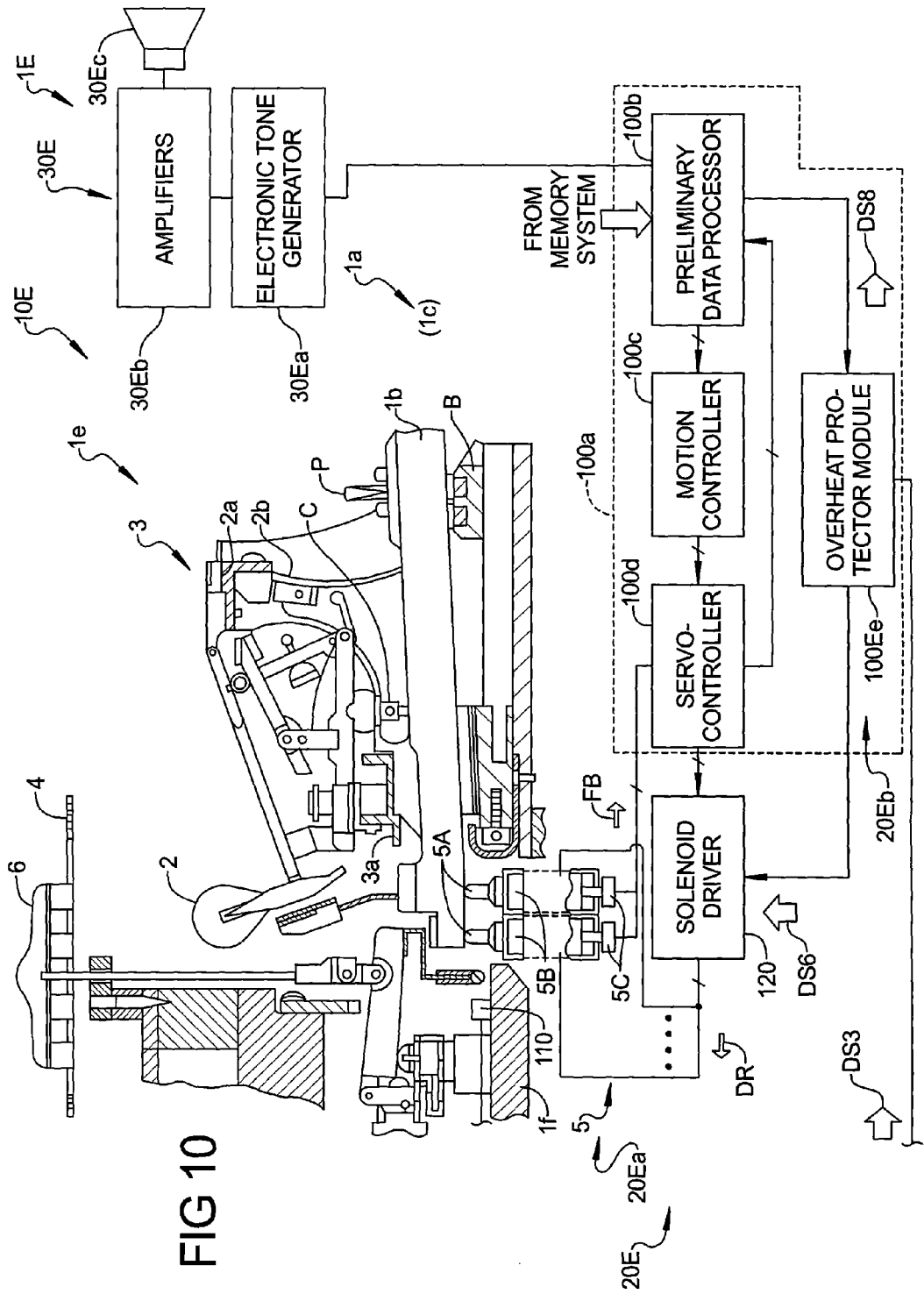
FIG. 10 is a view showing the system configuration of an automatic playing system incorporated in still another automatic player piano of the present invention.

An automatic player piano 1E may further comprise an electronic tone generating system 30E as shown in FIG. 10. The automatic player piano 1E largely comprises an acoustic piano 10E, an automatic playing system 20E and the electronic tone generating system 30E, and the automatic playing system 20E is also broken down into an automatic player 20Ea and an overheat protector 20Eb. The acoustic piano 10E, automatic player 20Ea and overheat protector 20Eb are similar in configuration to the acoustic piano 10, automatic player 20a and overheat protector 20b except for the electrical connection of the overheat protector module 100Ee, and, for this reason, component parts of acoustic piano 10E and other system components of automatic players 20Ea and overhead protector 20Eb are labeled with references same as those designating the corresponding components of acoustic piano 10 and corresponding system components of automatic player 20a and overheat protector 20b without detailed description.

The electronic tone generating system 30E includes an electronic tone generator 30Ea, amplifiers 30Eb and loud speakers 30Ec, and the preliminary data processor 100b is connected to the electronic tone generator 30Ea. The electric tone generator 30Ea has a waveform memory, and pieces of digital waveform data expressing the waveforms of acoustic piano tones are stored in the waveform memory. When the note-on event data code or codes are supplied to the electronic tone generator 30Ea, the electronic tone generator 30Ea analyzes the note-on event code or codes for electronic tones to be produced, and starts successively to read out the pieces of waveform data from the waveform memory. A digital audio signal is produced from the pieces of waveform data.

The electronic tone generator 30Ea is connected to the amplifiers 30Eb, which in turn is connected to the loud speakers 30Ec. The digital audio signal is converted to an analog audio signal, and is equalized and amplified in the amplifiers 30Eb. The analog audio signal is supplied to the loud speakers 30Ec, and is converted to the electronic tones.

The overheat protector module 100Ee is connected to the solenoid driver 120 and preliminary data processor 100b. When the overheat protector module 100Ee finds an overheated solenoid operated actuator or actuators 5 at step S7, the overheat protector module 100Ee produces a digital control signal DS8 as well as the digital control signal DS6, and supplies the digital control signals DS6 and DS8 to the solenoid driver 120 and preliminary data processor 100b at step S8.

The digital control signal DS8 is representative of the overheated state and the key number or numbers Kn equal to the number or numbers labeled with the overheated solenoid-operated actuator or actuators 5. While the automatic player 20Ea is reenacting a performance on the acoustic piano, the overheat protector module 100Ee is assumed to find an overheated solenoid-operated actuator 5. The overheat protector module 100Ee stops the driving signal DR, which is supplied to the overheated solenoid-operated actuator. When the preliminary data processor 100b receives the digital control signal DS8, the preliminary data processor 100b stops to supply the key event codes to the motion controller 100c, and supplies the key event codes to the electronic tone generator 30Ea. As a result, the electronic tone generating system 30E produces the electronic tone instead of the acoustic tone. Thus, the automatic player piano 1E does not interrupt the automatic performance under the condition of overheat.

When the solenoid-operated actuator 5 is recovered from the overheat state, the overheat protector module 100Ee changes the digital control signals DS6 and DS8 to the inactive level, and the automatic player 20Ea continues to reenact the performance through only the acoustic piano tones.

Claim languages are correlated with the components of the embodiments of automatic player pianos as follows. Correlation between the claim language and modifications are not hereinafter described for the sake of simplicity.

The automatic player pianos 1, 1A, 1B are corresponding to an "automatic player musical instrument." The black keys 1b and white keys 1b serve as "plural manipulators", and the pitch of tones is "an attribute of tones." The hammers 2, action units 3, strings 4 and dampers 6 as a whole constitute a "mechanical tone generator".

The automatic playing systems 20, 20A and 20B serve as "an automatic playing system", and solenoid-operated actuators 5 are corresponding to "plural solenoid-operated actuators". The driving signal DR is corresponding to a "driving signal". The automatic players 20a, 20Aa and 20Ba serve as an "automatic player", and the overheat protectors 20b, 20Ab and 20Bb serve as an "overheat protector." The temperature sensor 110 serves as a "temperature sensor." The solenoid driver 120, which is responsive to the digital control signal DS6, serves as a "rescuer", and the servo controller 100d, which is responsive to the digital control signal DS6 , also serve as the "rescuer."

The microcomputer MP and the subroutine program for overheat protection serve as an "information processor", and the subroutine program for overheat protection is corresponding to a "computer program." The microcomputer MP and the jobs at step S2 realize a "temperature rise estimator", and the microcomputer MP and the jobs at steps S3 and S4 realize a "solenoid temperature estimator." The microcomputer MP and the jobs at steps S5, S6 and S7 realize an "overheat detector."

The microcomputer MP and the subroutine program for automatic performance serve as "another information processor", and the subroutine program for automatic performance is corresponding to "another computer program." The microcomputer serves as "a core electronic circuit."

The time period from a previous timer interruption to each timer interruption is corresponding to "a time period from a previous activation and each activation", and the entry into the subroutine program for the overheat protection is corresponding to an "activation."

What is claimed is:

1. An automatic playing system of the type that operates a mechanical tone generator operable through a plurality of solenoid-operated actuators that have a critical temperature corresponding to an overheat state at which said actuators are damaged, comprising:
   an automatic player responsive to pieces of music data expressing a performance so as to produce said driving signal expressed as a variable electric current having a mean current value on the basis of said pieces of music data and selectively supplying said driving signal to said plural solenoid-operated actuators and
   an overheat protector for preventing said plural solenoid-operated actuators from overheating, the overheat protector having:
   a temperature sensor provided in the vicinity of said plural solenoid-operated actuators, and producing a temperature detecting signal representative of an environmental temperature around said plural solenoid-operated actuators in both of said energized state and non-energized state; and
   an information processor connected to said temperature sensor and connected to said automatic player to obtain said mean current value,
   wherein the information processor has read-write memory and is programmed to periodically populate a table stored in said memory to store, for each of a plurality of solenoids, the mean current value associated with that solenoid-operated actuator;
   said information processor is further programmed to periodically calculate and store in said table, for each of said plurality of solenoid-operated actuators, an increment of temperature value indicative of the temperature rise attributable to the present current in that solenoid-operated actuators as represented by said stored mean current value;
   said information processor is further programmed to periodically calculate for each of said plurality of solenoid-operated actuators a temperature rise value based on the accumulation of present and past calculated increment of temperature values for that solenoid-operated actuators;
   said information processor is further programmed to reduce the calculated temperature rise value, for each of said plurality of solenoid-operated actuators, by a temperature drop value that corresponds to the heat loss during both energized and non-energized states of a solenoid-operated actuator and thereby calculate an adjusted temperature rise value;
   said information processor is further programmed to read a stored data value indicative of ambient temperature in the vicinity of said plurality of solenoid-operated actuators and to add said ambient temperature to the adjusted temperature rise value and thereby calculate an ambient-adjusted operating temperature for each of said plurality of solenoid-operated actuators;
   said information processor is further programmed to compare at least one of the ambient-adjusted operating temperature for each of said plurality of solenoids with said critical temperature and based on said comparison to inhibit operation of said plurality of solenoid actuators if said at least one of said plurality of solenoid actuators is in said overheat state.

2. The automatic playing system as set forth in claim 1, wherein the processor is programmed to compare at least one of the ambient-adjusted operating temperature for each of said plurality of solenoids with said critical temperature at a periodic rate that is different from the rate at which tones are produced by the automatic player.

* * * * *